(12) United States Patent
Bauer

(10) Patent No.: US 8,688,128 B1
(45) Date of Patent: Apr. 1, 2014

(54) METHOD AND SYSTEM FOR PROVIDING TOLL-FREE TELEMATIC AND MOBILE SERVICES APPLICATIONS

(75) Inventor: Thomas Michael Bauer, Hillsborough, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 467 days.

(21) Appl. No.: 11/318,664

(22) Filed: Dec. 23, 2005

(51) Int. Cl.
*H04W 40/00* (2009.01)

(52) U.S. Cl.
USPC ........... 455/445; 455/405; 455/406; 455/433; 379/114.03

(58) Field of Classification Search
USPC .................. 455/406, 445, 405, 433
See application file for complete search history.

(56) References Cited

U.S. PATENT DOCUMENTS

| | | | |
|---|---|---|---|
| 5,740,239 A * | 4/1998 | Bhagat et al. ............ | 379/221.13 |
| 5,991,292 A * | 11/1999 | Focsaneanu et al. ......... | 370/352 |
| 7,308,248 B2 * | 12/2007 | Halsell ............................ | 455/406 |
| 2002/0147001 A1 | 10/2002 | Newdelman et al. | |
| 2003/0176199 A1 | 9/2003 | Burnham | |
| 2005/0239468 A1 | 10/2005 | Segal | |
| 2007/0093250 A1 * | 4/2007 | Italia et al. ..................... | 455/445 |

* cited by examiner

Primary Examiner — Wayne Cai
Assistant Examiner — Chuck Huyny

(57) ABSTRACT

Methods and systems of providing toll-free services access from a telecommunications network to a mobile device supported by toll-free telecommunications networks entail placing a called telephone number on a service provider's telecommunications network by identifying the called telephone number as a toll-free call, querying a database for called telephone number information for routing to a destination number, and routing the called telephone number using the called telephone number information through the service provider's telecommunications network to a wireless telecommunications network. The called telephone number is routed through the wireless telecommunications network by mapping the called telephone number and information to a mobile service identification number that identifies a mobile device hosted by a mobile switching center. A connection between the mobile switching center and the mobile device using the mobile service identification number is established to connect the toll-free call to the mobile device.

11 Claims, 3 Drawing Sheets

METHOD AND SYSTEM FOR PROVIDING TOLL-FREE TELEMATIC AND MOBILE SERVICES APPLICATIONS

FIELD

The embodiments relate to methods and systems for providing toll-free access from a telecommunications network to devices supported by mobile telecommunications services networks.

BACKGROUND

National and international toll-free communication services currently exist and are regulated by use and allowance based on specific called numbers that are recognized by the network originating the calls. For example, national toll-free communication systems use "0800" numbers, which can be re-recognized only at the national level, where callers must call from the same country in which the number has been allocated. The caller and the owner of the called number are always in the same country for use of the national toll-free system. Consequently, dialing from a foreign country is not allowed when using the national toll-free communication system.

International, toll-free, existing communications systems can use the national "0800" numbers and route calls to certain numbers in a particular country. For example, the international toll-free service can be used with national "0800" numbers when the caller and the owner of the called number are in the same country, or when the owner of the called number has purchased the toll-free service for use of telephone numbers in a particular country so that other callers can call the owner.

A Universal International Free-phone Number (UIFN) service can be used where, for example, the country code is "0800", and the number can be called from the same or different countries, such as the caller and the owner of the called number are in the same country, or both are in other countries and the services are paid by a subscriber. The Universal International Free-phone Number (UIFN) system can provide the calls to certain numbers at a free-of-charge rate for the caller as the company subscribing to the service can subsequently pay for the charges. However, this system provides very limited or no control over the individual using the service, and can result in high charges to the owners of the numbers or subscribers as the system does not generally provide verification of the callers' identity.

The existing toll-free communication systems are generally based on special numbers issued by regulatory agencies, either nationally or by the International Telecommunications Union ("ITU") for UIFN, and can be implemented on Intelligent Networks, where called numbers, in particular the specifically assigned new numbers beginning with the designation "0800", need to be set-up in the databases of each of the operators for networks from which the call will originate. Then, the calls are only allowed if the called number has been recognized by the network originating the call.

The existing wireless carrier networks, while able to support the placement of a call to a toll-free number from mobile devices, are not network providers of toll-free service themselves. These carriers do not provide toll-free mobile service. Further, the mobile industry's numbering standards do not support a toll-free number as an assignable mobile device's number.

Thus, a need exists for a toll-free telecommunications system, that allows toll-free telecommunications service from a public telephone network or a telecommunications network to a mobile device without the limitations of the currently existing "toll-free communication systems".

A need exists for toll-free systems and methods for providing universal and domestic toll-free access, one-stage dialing, and use of the same toll-free called telephone number as the destination toll-free telephone number and the caller identification value.

The embodiments meet these needs.

SUMMARY

The embodiments generally relate to systems and methods for providing toll-free access to a mobile, telecommunications service network from a service provider's telecommunications system using a called telephone number for processing the toll-free call and identifying the caller. The methods and systems process telephone calls in a toll-free telecommunications network utilizing mobile services applications that allow toll-free calling to mobile devices, such as a personal digital assistant (PDA), a cellular phone, a computer, a telematic device and combinations thereof.

The embodiments of the system for providing toll-free telecommunication services network access can include a device for sending a called telephone number to a local access telecommunication network that is adapted for routing the called telephone number to a toll-free carrier.

The toll-free carrier can be used for processing the called telephone number and called telephone number information as a toll-free call and deriving a unique destination number associated with a mobile telecommunications device. The toll-free carrier can include a telecommunications network with an access switch that can be connected to a termination switch by using interconnecting facilities. The toll-free carrier can include a server system located within the telecommunications network, which can be in communication with the access and termination switches and which includes a data storage hosting a database for processing the called telephone number and called telephone number information. The toll-free carrier can transmit the called telephone number and called telephone number information to a wireless carrier or a wireless telecommunications network, which includes a mobile switching center, a mobile device call processing database, and interconnecting facilities.

The wireless carrier can connect the toll-free call to a mobile switching center located within the network of the wireless carrier or on another wireless carrier's network with which the mobile device's service providing carrier has a traditional service roaming agreement. The wireless carrier then maps the called telephone number to a mobile service identification number that identifies a certain mobile device. Then, a connection between the mobile switching center and the certain mobile device can be established by using the mobile service identification number, and the toll-free call can be connected to the mobile device.

The methods for providing toll-free service access from a local provider or a public service provider's telecommunications network to a mobile device supported by a toll-free telecommunications services network and a mobile switching center includes placing a called telephone number on a wired telecommunications network. Originating toll-free calls placed from wireless or mobile devices can be considered equivalent to other access providers since the call is routed to the designated network of the toll-free service provider for the toll-free number. The methods entail identifying the called telephone number as a toll-free call, querying a database for called telephone number information for routing the called telephone number to a destination number, and routing the called telephone number using the called telephone number information through the wired telecommunications network to a wireless telecommunications network. The called telephone number can be routed through the wireless telecommunications network by mapping the called telephone number and information to a mobile service identification number that identifies a mobile device hosted by a mobile switching center. A connection between the mobile switching center and the mobile device using the mobile service identification number can be established to connect the toll-free call to the mobile device.

BRIEF DESCRIPTION OF THE DRAWINGS

The detailed description will be better understood in conjunction with the accompanying drawings as follows.

Figure 1:
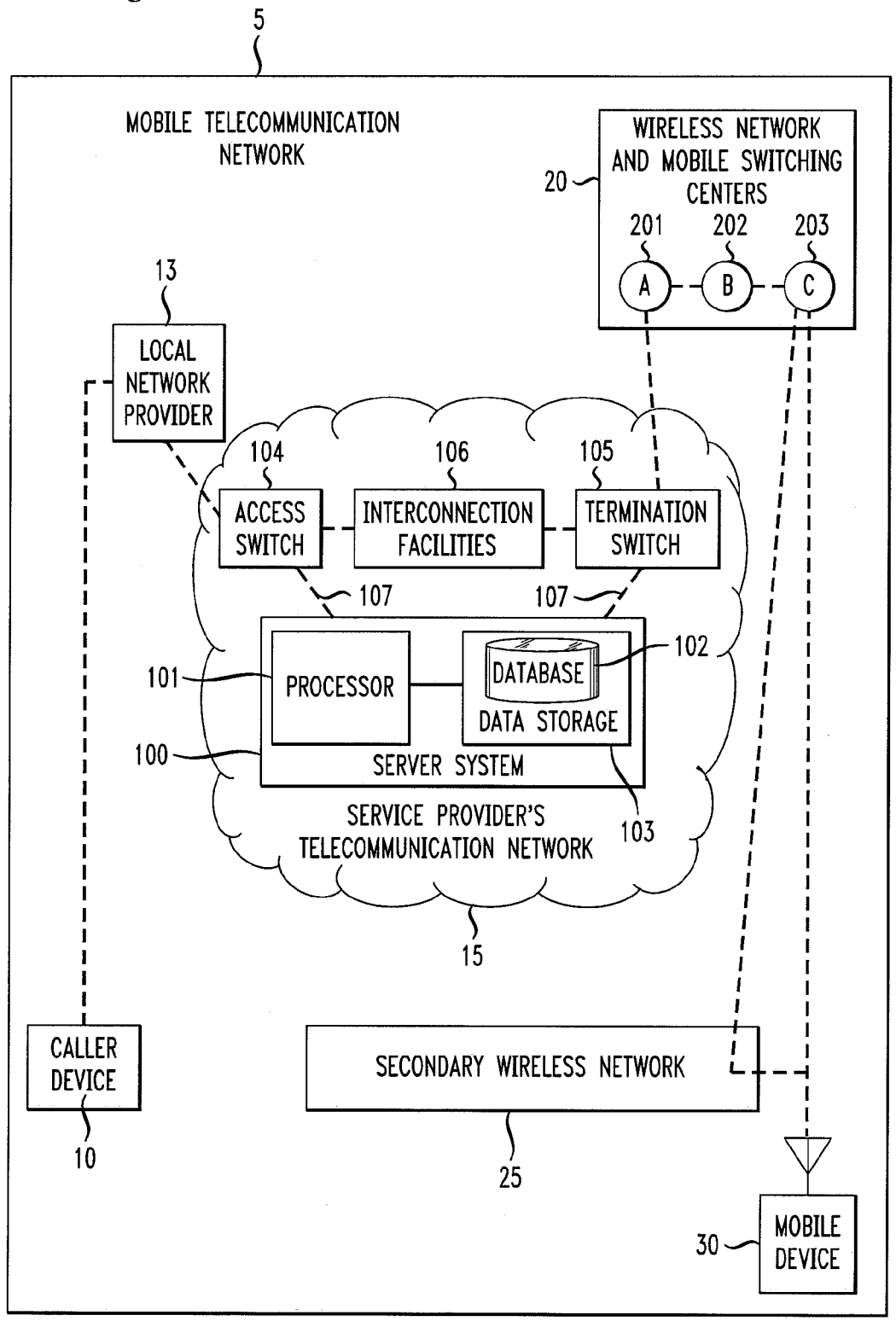
FIG. 1 depicts an embodiment of a system for providing toll-free telecommunications service access from a telecommunications network to a mobile device supported by a mobile telecommunications network.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that they can be practiced or carried out in various ways.

The embodiments generally relate to methods and systems for providing toll-free telephone call services access from a telecommunications network to a device supported by a mobile telecommunication services network.

Benefits of the embodied toll-free service access systems include a unique use of a single toll-free called telephone number to support separate and independent routings in two different telecommunications networks. For example, the same toll-free called telephone number, that can be used to direct the toll-free call to the service provider's telecommunications network for the toll-free call processing, can be used by the wireless telecommunications service provider and the mobile switching center for identifying and connecting to the destination mobile device for completion of the toll-free call.

The ability to use a single toll-free called telephone number enables one-stage toll-free calling to mobile devices without having to resort to the existing two-stage dialing methods of a toll free access number followed by a desired mobile device's number. In addition, the embodiments of the system avoid any limitations associated with use of one particular network, such as only recognizing numbers within that particular network for toll-free calling and which, in turn, provide universal domestic toll-free telecommunication services access for a larger consumer population. The embodiments of the toll-free service access systems and methods permit the toll-free called telephone number to be used in a caller identification context for identifying the mobile caller or the mobile calling device for the toll-free call service. The same number dialed by some attempting to call a mobile toll-free device can be displayed as the Caller-ID information to persons receiving a call from that same mobile toll-free service device.

The embodiments of the methods for providing toll-free service access from a telecommunications network to a mobile device supported by a mobile telecommunications services network include: placing a called telephone number on a wired telecommunications network that provides toll-free service, by identifying the called telephone number as a toll-free call, by querying a database for called telephone number information, and on routing the called telephone number to a destination number. The called telephone number information for receiving and routing the toll-free call can include such information as: calling party name, calling party number, destination calling information, other toll-free called telephone number information, and combinations thereof.

In an embodiment, the destination number can be the same toll-free number originally dialed to direct the call to the toll-free carrier's network which will now be used for enabling a mobile telecommunications network to identify and locate a mobile device for completing the toll-free call. Alternatively, the destination number can be a mobile service identification number that can be used directly by the mobile switching center to identify and locate the mobile device for hosting the toll-free call to the mobile device. The mobile service identification number can be translated or retrieved by the toll-free carrier's database The called telephone number can be routed through the wired telecommunication network to a wireless telecommunication network by using the called telephone number information. In an embodiment of the method, the toll-free call can be routed through a service provider's wired telecommunications network routing scheme designed to deliver the call to a terminating switch interface in the service provider's telecommunications network for interconnecting with and transmitting the called telephone number and called telephone number information to a wireless service provider's telecommunications network, that is a wireless carrier, which then locates the mobile switching center for completion of the toll-free call to the mobile device. The service provider's telecommunications network can be a toll-free service provider's telecommunications network and can include: a wired network, a wireless network, a cable network, a satellite network, and combinations thereof, for receiving and transmitting the called telephone number and other called telephone number information to the mobile telecommunications network.

The methods can include the steps of routing the called telephone number through the wireless telecommunication network, or wireless carrier network, by mapping the called telephone number with the called telephone number information to a mobile service identification number that can identify a mobile device that is hosted by a mobile switching center. The wireless telecommunications network can establish a connection between the mobile switching center and the mobile device using the mobile service identification number, and the called telephone number can be connected to the mobile device to complete the toll-free call.

The embodied mobile devices can include: a cellular phone, a personal digital assistant (PDA), a computer, and combinations thereof. The mobile device can be located and hosted by the mobile switching center using the mobile service identification number at the time the toll-free call is made. In an embodiment, the mobile switching center can route and connect the toll-free call to the mobile device, directly.

The embodiments of the method include the use of a computer-readable medium having stored thereon a plurality of computer instructions, wherein the plurality of computer instructions, when executed by a processor, perform the steps of the method for placing a called telephone number on a wired telecommunication network by: identifying the called telephone number as a toll-free call, performing a query of a database for called telephone number information on routing the called telephone number to a destination number, and routing the called telephone number through a wired telecommunications network to a wireless telecommunications network.

The embodiments of the system for providing toll-free telecommunication services network access to a mobile device supported by a mobile telecommunications network can include a device that can be used by a caller for sending a called telephone number to a local access telecommunication network that is adapted for routing the called telephone number to a toll-free carrier. The toll-free carrier can process the called telephone number and called telephone number information as a toll-free call, and the toll-free carrier can derive a destination number for establishing connections for the toll-free call.

The toll-free carrier can include a telecommunications network with an access switch that is connected to a termination switch by interconnecting facilities, and a server system in communication with the access and termination switches, which includes a data storage hosting a database for processing the called telephone number. The toll-free carrier can transmit the called telephone number and called telephone number information to a wireless carrier that can include a mobile switching center, a toll-free call processing database, and interconnecting facilities.

The wireless carrier can connect the toll-free call to a mobile switching center located within the network of the wireless carrier. The wireless carrier can map the called telephone number to a mobile service identification number that identifies a mobile device for completing the toll-free call. A connection between the mobile switching center and the mobile device can be established by using the mobile service identification number, and the toll-free call can be connected to the mobile device.

With regard to the figures, FIG. 1 depicts an embodiment of a system for providing toll-free service access to a mobile device supported by a mobile telecommunications network (5). The depicted system includes a caller using a device to send a called telephone number as a toll-free call from the caller's device (10) using a wired telecommunications network which includes a local access telecommunications network provider (13) to a long distance service provider's telecommunications network (15). The caller's telephone device (10) can transmit the called telephone number through the local access telecommunications network provider (13) to the toll-free service provider's telecommunication network (15), for providing access to the toll-free service provider's telecommunications network (15) for placing a toll-free call. The toll-free service provider's telecommunication network can include: a cable network, a wired network, a wireless network, a satellite network, and combinations thereof.

The service provider's telecommunications network (15) can include a server system (100) that includes a processor (101) in communication with a database (102) located in a data storage (103) of the server system (100). The server system (100), such as a computer system for a service provider's wired toll-free telecommunications network, can be in communication (107) with an access switch (104) for the telecommunications network and a termination switch (105), in which both switches are connected by interconnecting facilities (106) for the purpose of serving as elements of a routing design and scheme for transmitting the called telephone number and called telephone number information through the service provider's telecommunications network (15) to a wireless telecommunications network (20). The access switch can be the originating switch for accessing the service provider's telecommunications network.

The server system (100) can receive a signal with a call initiation message from the service provider's telecommunications network (15) via its signaling network. The service provider's telecommunications network (15) can include computer instructions located within the server system (100) for performing a digit analysis. The digit analysis allows recognition of the called telephone number and initiates a query of the database (102) based on that particular digit analysis. The server system (100) extracts the called telephone number information from the database (102) for routing the called telephone number as a toll-free call to a destination number. In an embodiment, the destination number can be the mobile service identification number used for identifying the mobile device (30). The mobile device can include: a cellular phone, a personal digital assistant (PDA), a computer, a telematic device, and combinations thereof.

Once the called telephone number information is extracted, then the called telephone number can be routed, using the called telephone number information, through the wired service provider's telecommunication network (15) to the wireless telecommunication network (20). The called telephone number and called telephone number information, including: calling party information, destination number information, toll-free telephone call information, other relevant called telephone number information, and combinations thereof, can be used by the service provider's telecommunications network for identifying the called telephone number as a toll-free call.

Next, the system can include the wireless telecommunication network (20) mapping the called telephone number with called telephone number information to a mobile service identification number that identifies the mobile device (30), which is hosted by a mobile switching center (203). At least one mobile switching center(s) (201, 202, and 203) located within the wireless telecommunications network (20) can receive the called telephone number from the service provider's telecommunications network (15) and query a server system with a database located within the wireless telecommunications network (20) for a mobile service identification number. The database of the server system within the wireless telecommunications network (20) stores mobile service identification numbers that can be associated with each unique mobile device (30). The mobile switching centers (201, 202, and 203) of the wireless telecommunications network (20) can connect the called telephone number as a toll-free call to the mobile device (30) by establishing a connection between a particular mobile switching center (203) and a particular mobile device (30) by using the mobile service identification number. As shown in FIG. 1, a secondary wireless telecommunications network (25), as an additional telecommunication network, can support the mobile device (30) associated with the mobile service identification number that is identified by the mobile switching centers of the wireless telecommunications network (20), such as roaming.

Figure 2:
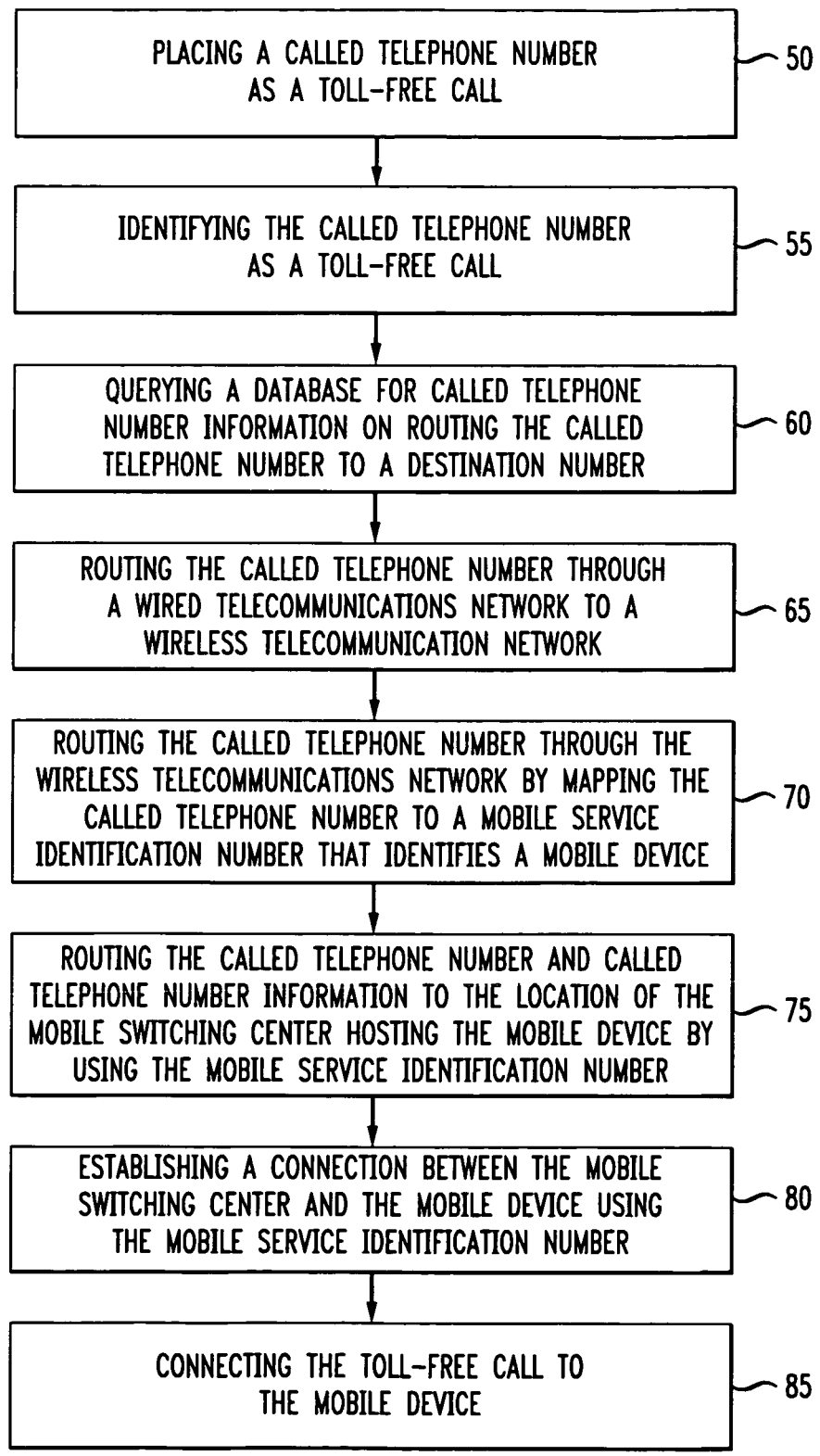
FIG. 2 depicts a flow chart of an embodiment usable in a method for providing toll-free service access from a telecommunications network to a mobile telecommunications service network.

FIG. 2 depicts a flow chart of an embodiment usable in a method for providing toll-free service access from a telecommunications network to a mobile device supported by a mobile telecommunications service network. The method includes placing a called telephone number as a toll-free call (Step 50) by performing the steps of: identifying the called telephone number as the toll-free call (Step 55), querying a database of a server system for called telephone number information corresponding to the called telephone number for routing the called telephone number to a destination telephone number (Step 60), and routing the called telephone number through a wired telecommunications network, such as a service provider's wired toll-free telecommunications network, to a wireless telecommunications network (Step 65).

The methods continue by routing the called telephone number and called telephone number information through the wireless telecommunications network by mapping the called telephone number to a mobile service identification number that identifies a mobile device as the destination for completing the toll-free call (Step 70). Then, the called telephone number and called telephone number information can be routed to a mobile switching center, which is located within the wireless telecommunications network and is hosting the mobile device (Step 75). Next, the method includes establishing a connection between the mobile switching center and the mobile device by using the mobile service identification number (Step 80). Then, the toll-free call can be connected to the mobile device (Step 85).

The following is an example of the embodied methods used for a call from a wire-line phone to a mobile device in an automobile. An Individual X wants to call an Individual Y with a mobile phone device in their car. Individual X, using their telephone (Calling Number: NPA-NXX-XXXX) dials the toll-free number (8YY-NXX-XXXX) associated with Individual Y. The local telecommunications provider for Individual X's phone receives the dialed digits (8YY-NXX-XXXX). Based on the 8YY-prefix queries, the Industry toll-free database determines the toll-free carrier providing service to that number.

Based on the identified carrier information returned from the database query, the local provider routes the call via their standard arrangement to deliver the call to the toll-free carrier's network. The toll-free carrier network receives the call at one of the access switches and performs a digit analysis on the called number. The digit analysis results in a determination that toll-free processing is required based on the 8YY format of the called number. A query including the called and the calling number is made to the carrier's toll-free service database to determine the toll-free service to be provided. The toll-free database processes the received information and retrieves a destination number (for example, 188-225-1234) and any other call delivery information needed to complete the call to the designated destination (for example, an "include Called Number in signaling" flag). The destination number and other call delivery information needed to complete the call to the designated destination is returned to the originating switch.

The originating switch uses the destination number as an index to the network routing scheme or design that transports and deliver the call to a terminating switch. The terminating switch has an inter-network connection interface to or with the wireless-carrier that provides service to the mobile device associated with the called number (8YY-NXX-XXXX). The terminating switch can initiate a call connection process with the wireless carrier's switch and can deliver the call related information (for example, Routing number—188-225-1234, Called Number—8YY-NXX-XXXX, and Calling Number—NPA-NXX-XXXX)

The wireless switch uses the Called Number (8YY-NXX-XXXX) to query their mobile device database to determine the location of the device. The database returns the current Mobile Switching Center associated with the mobile device and routes the call to that Mobile Switching Center. The Mobile Switching Center initiates a call connection to the mobile device. If successful, a call connection is established with the calling party.

The following is an example of the embodied methods used for a call from a computer system to a PDA device served by a wireless carrier.

A Computer W wants to call a PDA device Z with a mobile service capability. Computer W, using a telephone calling interface (Calling Number: NPA-NXX-XXXX) dials the toll-free number (8YY-NXX-XXXX) that Individual Y provided for the PDA device. The local telecommunications provider for Computer W's phone line receives the dialed digits (8YY-NXX-XXXX) and based on the 8YY-prefix queries the Industry toll-free database to determine the toll-free carrier providing service to that number. Establishing the call connection to the PDA device Z is established similar to the methods described in the first example. Once a call connection is made, the computer can transmit and receive information with the PDA device based on a pre-configured protocol supported by both the Computer W and PDA device Z.

The embodiments include computer readable medium having stored thereon a plurality of instructions, the plurality of instructions including instructions which, when executed by a processor, cause the processor to perform the embodied methods of providing a toll-free service access from a telecommunications network to a mobile device supported by a toll-free telecommunications network.

Figure 3:
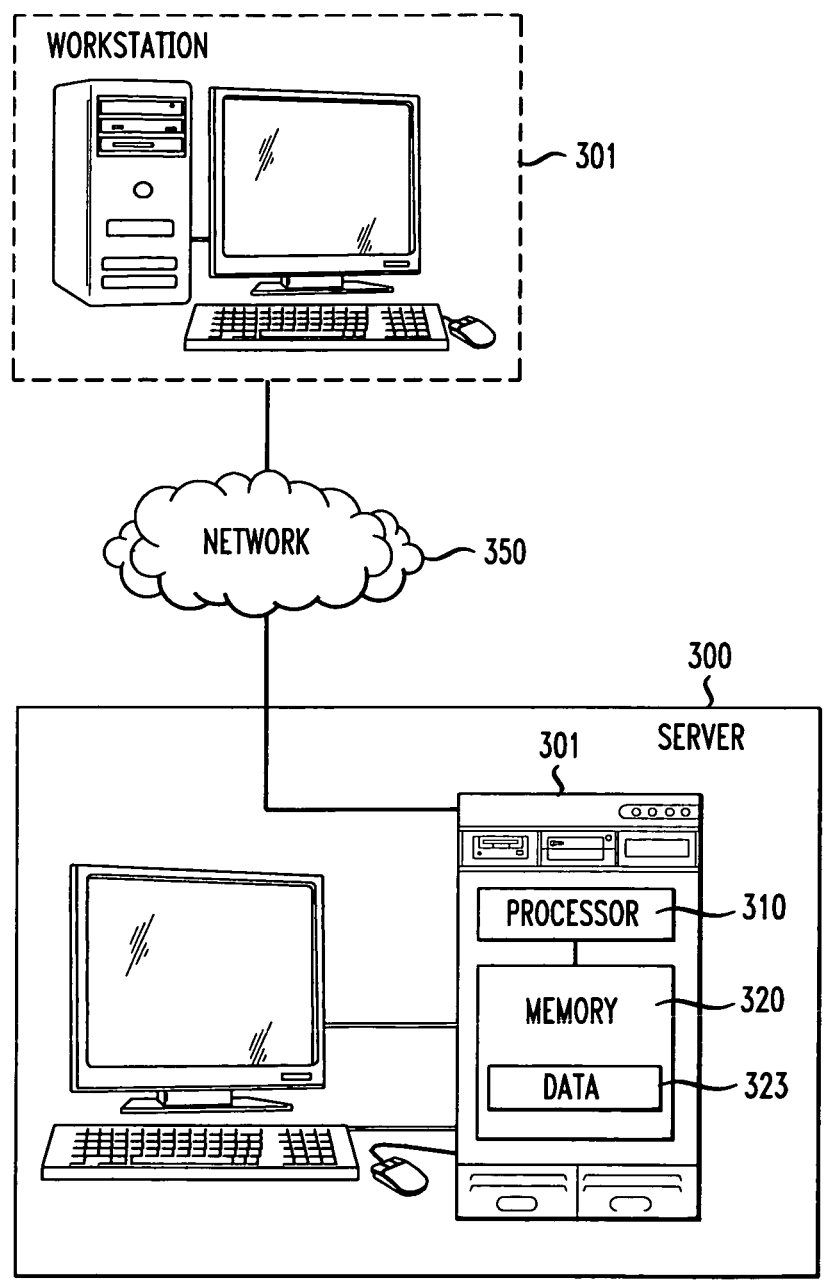
FIG. 3 depicts an illustration of a server to perform the embodied methods. A workstation is coupled to a server via a network.

FIG. 3 depicts an illustration of a server to perform the embodied methods. A workstation 360 is coupled to a server 300 via a network 350. The workstation includes a workstation computer 301, which can be coupled to a video display 302 via an external graphics bus 306. The external graphics bus 306 can be an Advanced Graphics Port (AGP) compliant bus. The term "coupled" encompasses a direct connection, an indirect connection, or the like. Server 300 in one embodiment includes a processor 310, such as the Pentium™ III processor manufactured by Intel Corp. of Santa Clara, Calif. In another embodiment, the processor 310 can be an Application Specific Integrated Circuit (ASIC). Server 300 can include a memory 320 coupled to the processor. Memory 320 encompasses devices adapted to store digital information, such as Dynamic Random Access Memory (DRAM), Rambus™ DRAM (RDRAM), flash memory, a hard disk, an optical digital storage device, a combination thereof, etc. The workstation computer 301 can be coupled to a keyboard 303 and a mouse 304 via an external computer bus 305. In one embodiment, the external computer bus 305 is a Universal Serial Bus (USB) compliant bus. In one embodiment, the workstation computer 301 can include a graphical user interface (GUI) module 321 to implement a graphical user interface.

Memory 320 can include instructions adapted to be executed by the processor 310 to perform the embodied methods. The term "instructions adapted to be executed" is meant to encompass any instructions that are ready to be executed in their present form (for example, machine code) by a processor, or require further manipulation (for example, compilation, decryption, decoding, or provided with an access code, etc.) to be ready to be executed by a processor (for example, processor 310).

Examples of network 350 include the internet, a WAN (wide area network), LAN (local area network), an intranet, a communications network, a computer network, a combination thereof, etc. In one embodiment, the server 300 is coupled to a storage device that typically stores data on a magnetic medium such as a magnetic disk. For example, the storage device may store application programs and associated data files/documents. Examples of documents include word processing documents, spreadsheet documents, HTML (Hypertext Markup Language) documents, and the like. Workstation 360 can access data stored in the storage device via server 300 and network 350. In an embodiment, workstation 360 can display information on display 302 by receiving information signals to server 300 via network 350. Examples of display information include data a GUI component, a web page, and the like.

Data 323 can encompass hierarchical data, non-hierarchical data, and the like. Data 323 can be a document corresponding to a particular application such as a word processing document, a spreadsheet document, an HTML document, and the like.

Computer instructions adapted to be executed by a processor to perform the embodied methods are stored on a computer-readable medium and distributed as software. The computer-readable medium can be a device that stores digital information. For example, a computer-readable medium includes a portable magnetic disk, such as a floppy disk; or a Zip™ disk, manufactured by the Iomega Corporation of Roy, Utah (Zip™ is a registered trademark of Iomega Corporation); or a Compact Disk Read Only Memory (CD-ROM) as is known in the art for distributing software. The computer-readable medium can be distributed to a user that has a processor suitable for executing instructions adapted to be executed While these embodiments have been described with emphasis on the embodiments, it should be understood that within the scope of the appended claims, the embodiments might be practiced other than as specifically described herein.

What is claimed is:

1. A method of providing a toll-free call from a wired telecommunication network to a mobile device supported by a wireless telecommunication network, wherein the method comprises:
    placing the toll-free call to a called telephone number via the wired telecommunication network by:
        identifying the called telephone number as a toll-free telephone number;
        obtaining, by the wired telecommunication network, a destination number associated with the toll-free telephone number, wherein the destination number comprises a mobile service identification number of the mobile device, wherein the mobile service identification number is useable by a mobile switching center of the wireless telecommunication network to identify and locate the mobile device;
    routing the called telephone number and the called telephone number information through the wired telecommunication network to the wireless telecommunication network via a terminating switch in the wired telecommunication network, wherein the wired telecommunication network comprises an access network and a toll-free telecommunications network, wherein the called telephone number information comprises the destination number associated with the toll-free telephone number; and
    delivering a calling party telephone number to the wireless telecommunication network;
    routing the called telephone number through the wireless telecommunication network by directly identifying the mobile device, by the mobile switching center, using the destination number that comprises the mobile service identification number of the mobile device;
    establishing a connection between the mobile switching center and the mobile device using the mobile service identification number; and
    connecting the toll-free call to the mobile device.

2. The method of claim 1, wherein the toll-free telecommunications network is a cable network.

3. The method of claim 1, wherein the mobile device is hosted by the mobile switching center at a time the toll-free call is made.

4. The method of claim 1, wherein the mobile device is a cellular phone.

5. A system for providing a toll-free call, comprising:
    a device for sending a called telephone number to a local access telecommunication network, wherein the local access telecommunication network is for routing the called telephone number to a toll-free carrier;
    the toll-free carrier comprising:
        a wired telecommunications network comprising:
            an access switch;
            a termination switch for initiating a call connection process with a mobile switching center of a wireless carrier using a mobile service identification number that is used by the mobile switching center to identify and locate a mobile device, wherein the mobile service identification number is obtained in the wired telecommunications network by querying a database in the wired telecommunications network to extract called telephone number information on for routing the called telephone number to a destination number, wherein the destination number is the mobile service identification number;
            a server system in communication with the access switch and the termination switch, wherein the server system comprises:
                a processor; and
                a data storage hosting the database; and
            interconnecting facilities for interconnecting the access switch to the termination switch, wherein the wired telecommunications network receives and transmits a calling party telephone number;
        a wireless carrier comprising the mobile switching center and interconnecting facilities, wherein the wireless carrier is for connecting the toll-free call to the mobile switching center and to the mobile device; and
    the mobile device with the mobile service identification number for receiving the toll-free call from the mobile switching center.

6. The system of claim 5, wherein the called telephone number is routed through the toll-free carrier to deliver the called telephone number to the wireless carrier.

7. The system of claim 5, wherein the toll-free carrier is a cable network.

8. The system of claim 5, wherein the mobile device is a cellular phone.

9. A non-transitory computer-readable medium storing a plurality of computer instructions which, when executed by a processor of a wired telecommunication network, perform operations for providing a toll-free call from the wired telecommunication network to a mobile device supported by a wireless communication network, the operations comprising:
    placing the toll-free call to a called telephone number via the wired telecommunication network by:
        identifying the called telephone number as a toll-free telephone number;
        obtaining, by the wired telecommunication network, a destination number associated with the toll-free telephone number, wherein the destination number comprises a mobile service identification number useable by a mobile switching center of the wireless telecommunication network to identify and locate the mobile device;

routing the called telephone number and called telephone number information through the wired telecommunication network to the wireless telecommunication network via a terminating switch in the wired telecommunication network, wherein the wired telecommunication network comprises an access network and a toll-free telecommunications network, wherein the called telephone number information comprises the destination number associated with the toll-free telephone number; and delivering a calling party telephone number to the wireless telecommunication network, wherein a mobile switching center of the wireless telecommunication network routes the called telephone number through the wireless telecommunication network by directly identifying the mobile device using the destination number that comprises the mobile service identification number of the mobile device, establishes a connection between the mobile switching center and the mobile device using the mobile service identification number, and connects the toll-free call to the mobile device.

10. The non-transitory computer-readable medium of claim 9, wherein the operations further comprise querying a database for providing the called telephone number information, wherein the database is housed within a data storage located on a server system, wherein the server system is located within the wired telecommunication network.

11. The non-transitory computer-readable medium of claim 9, wherein the wired telecommunication network comprises an access switch that connects to a termination switch by interconnecting facilities, wherein the access switch and the termination switch are in communication with a server system of the wired telecommunication network for transmitting the called telephone number and the called telephone number information to the wireless telecommunication network.

\* \* \* \* \*